United States Patent
Kent et al.

(10) Patent No.: US 7,383,053 B2
(45) Date of Patent: Jun. 3, 2008

(54) POSITION ESTIMATION OF TRANSCEIVERS IN COMMUNICATION NETWORKS

(75) Inventors: Claudia A. Kent, Pleasanton, CA (US); Farid Dowla, Castro Valley, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 10/834,706

(22) Filed: Apr. 28, 2004

(65) Prior Publication Data

US 2005/0255864 A1 Nov. 17, 2005

(51) Int. Cl.
*H04Q 7/20* (2006.01)
(52) U.S. Cl. ............... 455/456.5; 342/458; 340/10.34; 367/127
(58) Field of Classification Search ............... 342/458; 367/127; 340/10.34; 455/456.5
See application file for complete search history.

(56) References Cited

U.S. PATENT DOCUMENTS

| | | | |
|---|---|---|---|
| 5,280,457 A * | 1/1994 | Figueroa et al. ............ 367/127 |
| 6,054,950 A | 4/2000 | Fontana | |
| 6,278,989 B1 * | 8/2001 | Chaudhuri et al. ............ 707/2 |
| 6,486,831 B1 * | 11/2002 | Martorana et al. .......... 342/458 |
| 6,611,234 B2 | 8/2003 | Fullerton et al. | |
| 6,674,396 B2 | 1/2004 | Richards et al. | |
| 2003/0028323 A1 | 2/2003 | Zeitler et al. | |
| 2003/0076879 A1 | 4/2003 | Langford et al. | |
| 2003/0174048 A1 * | 9/2003 | McCorkle ................. 340/10.34 |
| 2003/0174086 A1 | 9/2003 | Hirt | |

FOREIGN PATENT DOCUMENTS

EP 0518 146 A2 * 12/1992

OTHER PUBLICATIONS

Closed-form Least squares source Location Estimation from Range-Difference Measurements, by J. Smith and J. Abel, IEEE Transactions on Acoustics and Speech vol. ASSP-35, No. 12, pp. 1661-1669, 1987.*
A Statistical Approach to Non Line of Sight BS identification, by Saipradeep Venkatraman and James Caffery Jr., Wireless Personal Multimedia Communications 2002 5th Symposium on Oct. 27-30, Piscataway NJ, USA ,IEEE, vol. 1, Oct. 27, 2002, pp. 296-300.*
Joon-Yong Lee et al, Ranging In A Dense Multipath Environment Using An UWB Radio Link. IEEE Journal On Selected Areas In Communications. vol. 20, No. 9, pp. 1677-1683. Dec. 2002.

* cited by examiner

*Primary Examiner*—Lester G. Kincaid
*Assistant Examiner*—Charles Shedrick
(74) *Attorney, Agent, or Firm*—John P. Wooldridge; Michael C. Staggs; John H. Lee

(57) ABSTRACT

This invention provides a system and method using wireless communication interfaces coupled with statistical processing of time-of-flight data to locate by position estimation unknown wireless receivers. Such an invention can be applied in sensor network applications, such as environmental monitoring of water in the soil or chemicals in the air where the position of the network nodes is deemed critical. Moreover, the present invention can be arranged to operate in areas where a Global Positioning System (GPS) is not available, such as inside buildings, caves, and tunnels.

20 Claims, 4 Drawing Sheets

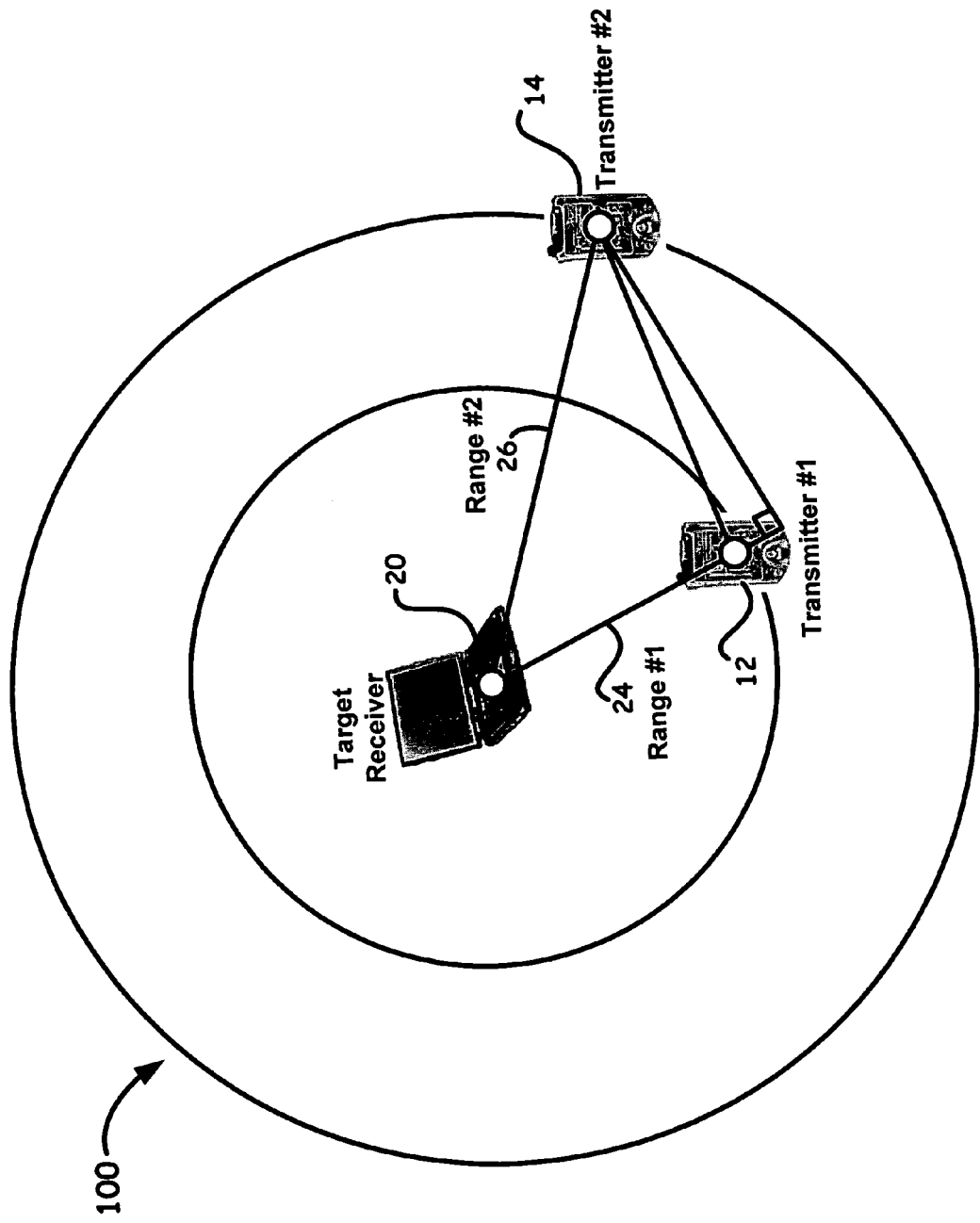

POSITION ESTIMATION OF TRANSCEIVERS IN COMMUNICATION NETWORKS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a position determination. More specifically, the present invention provides a position estimation system and method by a wireless communication network.

2. State of Technology

The maturing of integrated circuitry, micro-electromechanical systems (MEMS) and communication theory has precipitated the emergence of wireless networks and has led to the economic and computational feasibility of networks having a large number of self-sufficient and/or reliant nodes. Each node can be designed to, for example, sense elements of its environment, perform simple computations, and/or communicate with peer groups or directly to an external interrogator. In wireless network applications such as environmental monitoring of ground water or airborne chemicals, firefighters in buildings, or soldiers in caves, it is desirable to know the location of such network nodes independent of, for example, a Global Positioning System (GPS).

Background information on an existing technology that computes estimates of unknown locations of, for example, a radio terminal or a radio tag emitting a signal can be found in, U.S. Pat. No. 2003/0174086 A1, titled "Determining a Time of Arrival of a Sent Signal," issued Sep. 18, 2003 to Hirt, including the following: "The present invention provides a solution for determining a time of arrival $t_n$, abbreviated to TOA, and if desirable, the absolute TOA, of one or a plurality of signals emitted by one or a plurality of transmitters, e.g. terminals or radio tags, and receivable at different location of known spatial coordinates. In particular, the solution is based on measuring and comparing the total signal transfer time (TSTT) of signals, in such a way that explicit knowledge of absolute time or absolute time synchronization between components located at different spatial positions is not required."

Background information on a system and method that utilizes peer-to-peer proximity measurements together with a known geographical position can be found in, U.S. Pat. No. 6,473,038 B2, titled, "Method and Apparatus for Location Estimation," issued Oct. 28, 2002 to Patwari et al., including the following: "a system and method operate to provide location estimates for mobile devices. The system does not require a great deal of installed infrastructure. Moreover in the case of urban canyons and inside buildings where there are numerous obstructions to the propagation of signals (e.g., GPS signals), the system is able to function to provide location information for devices that might otherwise be out of range."

Background information on a system that utilizes Ultra Wideband (UWB) or short pulses to estimate the position of a receiver by measuring the one-way flight time of a pulse sent from multiple independent transmitters can be found in, U.S. Pat. No. 6,054,950, titled, "Ultra Wideband Precision Geolocation System," issued Apr. 25, 2000 to Fontana, including the following, "The system includes a set of N (where N>2) untethered UWB transceivers located at fixed positions, an untethered UWB receiver at the target, and a processor at the target for resolving time-of-flight measurement ambiguities of received pulses to determine precise geolocation by solving a set of equations according to time-of-flight measurements and surveyed positions of N1 transceivers."

Background information on a system that utilizes transmitted and received pulse trains to measure distances between radio devices can be found in, U.S. Pat. No. 6,674,396 B2, titled, "System and Method For Distance Measurements by Inphase and Quadrature Signals in A Radio System," issued Jan. 6, 2004 to Richards et al., including the following, "the key to measuring a distance according to the present invention is to precisely measure the time it takes for a single bit to travel from a first radio transceiver to a second radio transceiver. Since in reality it is difficult to transmit and receive a single bit, the distance is measured by determining the time it takes a pulse train to travel from a first radio transceiver to a second transceiver and then from the second radio transceiver back to the first radio transceiver. Stated in other terms, the distance is measured by determining the travel time for a complete exchange of data between the first and second radio transceivers."

Background information on a system that utilizes beacons to determine a location of mobile units can be found in, U.S. Patent No. 2003/0028323, titled, "Material Handling Systems with High Frequency Radio Location Devices," issued Feb. 6, 2003 to Zeitler et al., including the following, "A material handling system uses high-frequency location devices for determining the location of mobile units, such as AGV's, overhead mono-rails, conveyor components, or individual articles being transported by such devices . . . . The location devices work in cooperation with a number of stationary location devices, such as beacons, that are positioned within the environment at known locations, such as in or adjacent the ceiling of the workplace environment."

Accordingly, the present invention provides a wireless localization solution by a method and system that includes statistical processing of time of flight information to estimate a position of a receiving device.

SUMMARY OF THE INVENTION

Accordingly, the present invention wireless position estimation method that includes statistically filtering time of flight information resulting from replies to queries to produce a plurality of range measurements; and calculating a position estimate as a result of processing a predetermined collected number of filtered range measurements.

Another aspect of the present invention is to provide a wireless position estimation method that includes: transmitting from one or more known positions a plurality of queries; continuously collecting a plurality of replies from one or more receivers upon receipt of the plurality of queries; filtering time of flight information resulting from the transmission and the one or more replies to produce a plurality of range measurements; wherein the filtering includes a two-stage statistical analysis; and calculating a position estimate of each of the one or more receivers as a result of a predetermined collected number of filtered range measurements from the one or more known positions.

A final aspect of the present invention provides a position estimation wireless system that includes at least one receiver and one or more transmitters arranged from known positions and capable of transmitting a plurality of said wireless queries; wherein statistically filtering of wireless replies produce a plurality of range measurements that can be further utilized to calculate a position estimate to locate unknown receivers.

Accordingly, the invention provides a wireless localization solution by a method and system that includes statistical processing of time of flight information to estimate a position of a receiving device. Such an invention can be applied in sensor network applications, such as environmental monitoring of water in the soil or chemicals in the air where the position of the network nodes is deemed critical. Moreover, the present invention can be arranged to operate in areas where a Global Positioning System (GPS) is not available, such as inside buildings, caves, and tunnels.

BRIEF DESCRIPTION OF THE DRAWINGS

The accompanying drawings, which are incorporated into and form a part of the disclosure, illustrate an embodiment of the invention and, together with the description, serve to explain the principles of the invention.

FIG. 1 shows a graphical representation of the position estimation system of the present invention.

FIG. 2(*b*) shows a histogram of the received data grouped into 100 μsec bins.

FIG. 2(*c*) shows the received data plotted without the data outliers.

FIG. 2(*d*) shows a plot of single scalar distance points of the received data after weighted least squares (WLS) filtering.

DETAILED DESCRIPTION OF THE INVENTION

Figure 2A:
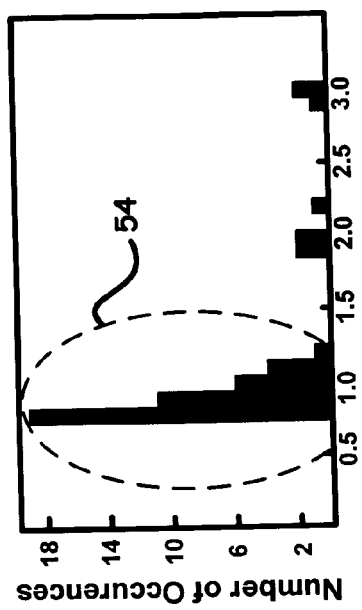
FIG. 2(*a*) illustrates a batch of received data that includes disproportionate spikes of data outliers shown.
Figure 2B:
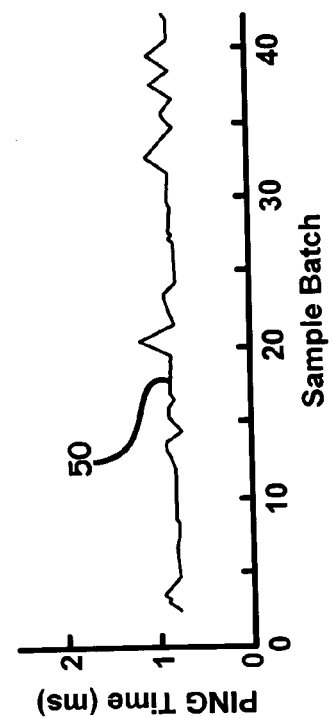

Referring now to the following detailed information, and to incorporated materials; a detailed description of the invention, including specific embodiments, is presented. The detailed description serves to explain the principles of the invention.

Unless otherwise indicated, all numbers expressing quantities of ingredients, constituents, reaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

General Description

A network as disclosed herein, often includes transmitter and receiver nodes distributed randomly within a predetermined area depending upon the ranging capabilities of the utilized wireless communication frequency bands, e.g., IEEE, Ultra-Wideband, etc. Transmitters in the present invention have known positions via, for example, satellites or other methods known in the art, while receivers have unknown positions. Generally, transmitters can determine receiver(s) position through time-of-flight ranging and information sharing.

The present invention provides a closed-form (i.e., an exact mathematical solution) two or three dimensional position estimation method and system to determine one or more receiver(s) positions of down to less than about 20 feet, more often down to about one foot in distance by combining multiple round trip time of flight measurements collected by one or more transmitters, often at least four transmitters communicating in a wireless network with such receivers. Such a localized position estimation method and system is provided by statistically monitoring time durational interaction, i.e., time-of-flight, of devices, such as, but not limited to, cell phones, pagers, personal identification cards, laptops, and Personal Digital Assistants (a handheld personal computer, e.g., an iPAQ manufactured by Hewlett Packard/COMPAQ), having wireless communication circuitry embedded in their framework.

Specific Description

FIG. 1 shows an example of a system, generally designated by the reference numeral 100, designed around an infrastructure of devices, which are capable of wireless network communication. FIG. 1 graphically illustrates a pair of hand-held transmitters 12, 14, such as, but not limited to iPAQ's, operating within such a system, for example, a large area wireless network (LAN), arranged to find an unknown receiver 20 position, such as a laptop computer as depicted in FIG. 1, capable of replying to one or more wireless protocol queries produced by transmitters 12, 14. From such an example arrangement, a first range measurement 24 and a second range measurement 26, produced by wireless communication statistically analyzed time-of flight data (denoted by d), are combined in such a way using the Pythagorean Theorem (PT) to calculate, using a closed-form least squares method, a position estimate of receiver 20. Such a closed-form calculation method is disclosed in "Closed-Form Least Squares Source Location Estimation from Range-Difference Measurements," by J. Smith and J. Abel, IEEE Transactions on acoustics and Speech vol. ASSP-35, no. 12, pp. 1661-1669, 1987, herein incorporated by reference in its entirety. Although two detectors are shown in the illustrated example of FIG. 1, more often a minimum of at least three transmitters and a minimum of at least three range measurements are utilized in the present invention to determine a unique receiver position and so as to eliminate ambiguity in the position estimation method as disclosed herein.

As a beneficial wireless communication embodiment, system 100, as shown in FIG. 1, can include Ultra Wideband (UWB) communication interfaces. In UWB communication systems, pulses are often transmitted as a sequence of impulses; wherein there is no carrier frequency. There is no specific frequency associated with this technique; rather, its frequency spectrum is related by, for example, the Fourier transform of the pulse and can generally span hundreds of megaHertz to several gigaHertz. It is inherently spread-spectrum. Such a technique spreads the signal so that it overlays any other signals in its bandwidth. But the key to utilizing such a technique is its very low power level, which makes it appear as noise to most other narrowband or spread-spectrum equipment.

The same pulse shape can be transmitted and modulated based on, for example, changing amplitude, position, or time separation between the pulses for a number of respective channels. In addition, the free-space radiated pulse may have a pulse-width of about 5 ns or less, often about 1 ns or less, and more often less than about 200 picoseconds wide with average power levels of up to about 5 mW. When utilizing beneficial transmitted pulse durations of less than about 200 picoseconds, range determinations can easily be resolved to less than about one foot by the methods of the present invention. To achieve such accuracy on the order of less than about one foot, transmitters and receivers of the present invention can be designed to each have orthogonal binary identification (ID) codes. In such an arrangement, a transmitter can send its encoded UWB signal to a receiver in the form of an electronic query, which is capable of replying with the exclusive-or of the transmitter and receiver codes. On receiving a wireless reply, the transmitter can extract the receiver ID code and time-of-flight information to calculate a range of the receiver node. Orthogonal codes can be utilized to provide unique radio identity allowing ranging to take place as accurately as possible within the physical layer so as to not rely on software timing.

In an additional arrangement, system 100, as shown in FIG. 1, may include commercial wireless interfaces, such as but not limited to, infrared and/or microwave technologies operating at, for example, about the 2.4 GHz and 5 GHz bands, which allows integration into such personal devices, (e.g., iPAQ's, cell phones, etc.) and thus capable of being implemented into the present invention. For example, a wireless network, such as Bluetooth, a registered trademark of Bluetooth SIG, INC., Corporation by Assignment, Delaware, located in Washington D.C., may be used in the position estimation system and method of the present invention. Such a technology is built into a small microchip and operates in a globally available frequency band (i.e., 2.4 GHz), ensuring communication compatibility worldwide. Bluetooth, incorporating a radio transceiver such as a microchip, is capable of being integrated into the personal devices of the present invention to facilitate fast and secure transmission of data, even when the devices are not within line of sight.

As another example embodiment, a wireless technology, such as, but not limited to, International Electronic and Electrical Engineers (IEEE) 802.11a or IEEE 802.11b, may additionally be incorporated into the present invention as the wireless standard based on its present common use in both business and home environments that enables users high-speed access to networks and the Internet while roaming throughout an area. Moreover, several new IEEE protocols for wireless communication, such as, but not limited to, an UWB physical layer (PHY) option in the IEEE 802.15.3 Personal Area Network (PAN) standard that can support data rates of up to 110 Mbits/s over a range of 10 m, and others, are also ready for introduction for use in wireless systems and may be considered as a protocol for the wireless standard of the present invention.

As an example method embodiment using such IEEE technology, each transmitter 12, 14, and receiver 20, as shown in FIG. 1, equipped with, for example, an IEEE 802.11b Wireless LAN PC Card, capable of operating at a frequency of 2.4 GHz with a maximum data rate of 11 Mbps, can be arranged to exchange queries and responses so as to compute and store time-of flight data between such devices. Each query can be in the form of, but not limited to, a "PING signal," i.e., a type of wireless signal transmitted from a first interactive wireless device in order to obtain information from other interactive wireless devices within a predetermined range of the first device. However, PING is a high level protocol having a low priority in a CPU stack, which therefore can reduce the accuracy of collected time-of-flight measurements because of computer timing issues. In addition, PING requires full cooperation from a receiver nullifying a possibility of finding an out-of-compliance network node. Therefore, although PING may be implemented into the framework of the present invention, a beneficial communication protocol is to replace PING with a communication protocol on the physical-layer, e.g., using a IEEE 802.15.3 (PAN) standard as discussed above, or a medium access control (MAC) layer. Such communication protocols can solve CPU stack-priority issues and can enable communication in a non-cooperative environment.

For every query, such as for example, a PING or a MAC level query, issued by a predetermined transmitter, such a transmitter can receive a batch of as one example, 50 replies verifying a connection and noting an elapsed time. As each batch of replies arrives, received information is directed through two stages of statistical filtering to extract a real query time, since signal multi-path and unknown computer processing time can impart substantial variation within a batch and between batches.

Measurement Filtering

FIGS. 2(*a*), 2(*b*), 2(*c*), and 2(*d*), graphically illustrates the filtering stage method of the present invention designed to remove data outliers to enable calculation of a single scalar distance measurement. FIG. 2(*a*) shows a batch 50 of received data having such data outliers, shown as disproportionate spikes 52. Each batch 50 of data, as shown in FIG. 2(*a*) is then sent through two stages of filtering to extract the real query time, shown in this example as the PING time.

In the first filter stage, batch 50 of received data, as shown in FIG. 2(*a*), is distributed in a histogram, as shown in FIG. 2(*b*), having predetermined bin widths, e.g., the 100 μsec bin widths as shown in FIG. 2(*b*). A primary subset 54 of the received data, shown encircled by the dashed lines, is extracted and re-plotted, as shown in FIG. 2(*c*), leaving the data in this example within a range of approximately 100-300 μsec, as opposed to the original 5 ms range, as shown in FIG. 2(*a*).

A second filter stage includes a recursive weighted least-squares (WLS) estimator capable of predicting a true value of a variable given sequential batches of "noisy" (e.g., data outliers) variable measurements over time. Such a filter works recursively by updating the least-squares solution after every new batch of data arrives. For an example query, such as a PING, issued at the $k^{th}$ sampling interval, a batch of m new measurements $z_k$ is received and the PING time at the next interval $z_{k+1}$ is estimated and called $\hat{z}_{k+1}$. To achieve this, $z_k$ is assumed to have the form:

$$\hat{z}_k = Hx_k + n_k;, \text{ where } H = \begin{bmatrix} 1 & t_1 \\ \vdots & \vdots \\ 1 & t_m \end{bmatrix}. \quad (1)$$

Assuming a first-order system of constant velocity, the matrix H defines the behavior of the system, the vector $n_k$ is the residual measurement error, and $\Delta t = t_n - t_{n-1}$ is the sampling time. Accordingly, the WLS solution to equation (1) is:

$$\hat{x}_k = \hat{x}_{k+1} + K_k(z_k - H\hat{x}_{k+1}); \quad (2)$$

which is the estimate $x_k$ that minimizes a quadratic cost function of residual error and includes the previous estimate plus the residual error scaled by a gain matrix. Such a gain matrix of the present invention is:

$$K_k = P_{k-1} + H^T(HP_{k-1}H^T + R_k)^{-1}; \quad (3)$$

where $P_k$ is the error covariance matrix representing the error after the kth estimate;

$$P_k = (P_{k-1}^{-1} + H^T R_k^{-1} H)^{-1}. \quad (4)$$

Finally, some of the measurements are presumed better than others and a "weighting matrix" $R_k$ is defined, which is proportional to each new measurement's variation from the previous estimate, or:

$$N_k = I z_k - I \hat{z}_{k-1}; \text{ and} \quad (5)$$

$$R_k^{-1} = (N_k^T N_k)^{-1} = \begin{bmatrix} \frac{1}{(z_{k1} - \hat{z}_{k-1})^2} & 0 & 0 \\ 0 & \ddots & 0 \\ 0 & 0 & \frac{1}{(z_{k1} - \hat{z}_{k-1})^2} \end{bmatrix}; \quad (6)$$

where the operator is an element-by-element product of the measurement vector $z_k$ with the identity matrix, resulting in a diagonal matrix of measurement values. Such weights can "reward" points that are more closely equal to the previous estimate in a feedback operation.

Figure 2C:
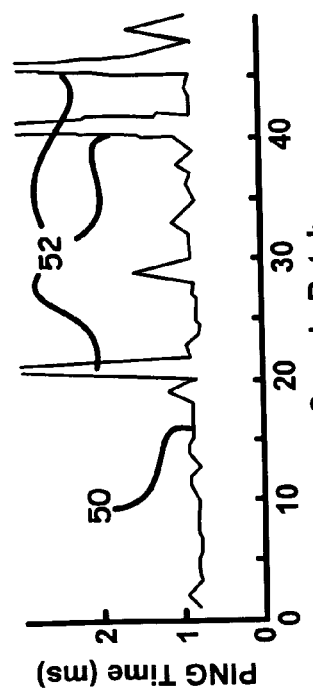
Figure 2D:
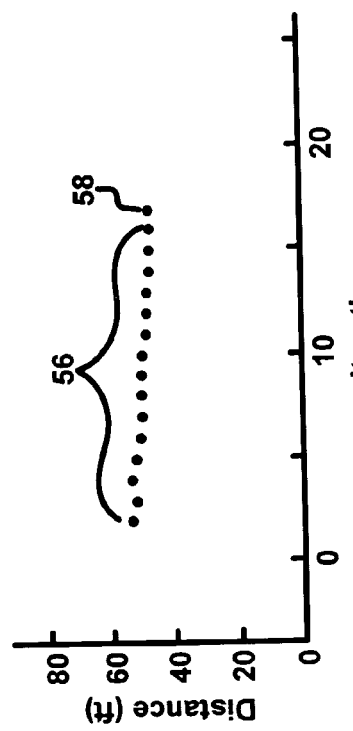

Returning back to the figures, FIG. 2(c) shows batch 50 of received data plotted with data outliers 52 of FIG. 2(a) removed by the first filter stage. FIG. 2(d) shows a plot of distance versus iteration of the results of the second WLS filtering stage, having single scalar points 56 plotted as calculated by equations (1)-(6) with a final single scalar point 58 plotted as the most recent update.

Generating Position Estimates

Each transmitter of the present invention can be designed to utilize a structured graphical user interface (GUI) non-commercial, commercial, or modified commercial software package such as, for example, MATLAB, to operate as a communications infrastructure and enable such transmitters to share received most current filtered range measurements, R*, associated with each receiver. Range estimate is the round-trip time of flight (TOF) filtered using the methods as discussed above multiplied by the velocity of the signal (the speed of light). With enough R*'s, a final converged position estimate of a system network can be calculated using the closed-form method of equations (5) and (6), with a position estimate of a receiver value using the methods of the present invention converging to and remaining at a settled value after a predetermined time, such as, for example, about 1000 time-steps (e.g., one minute sampling at 10 ms).

Ranging Accuracy and Additional Transmitters

Figure 3:
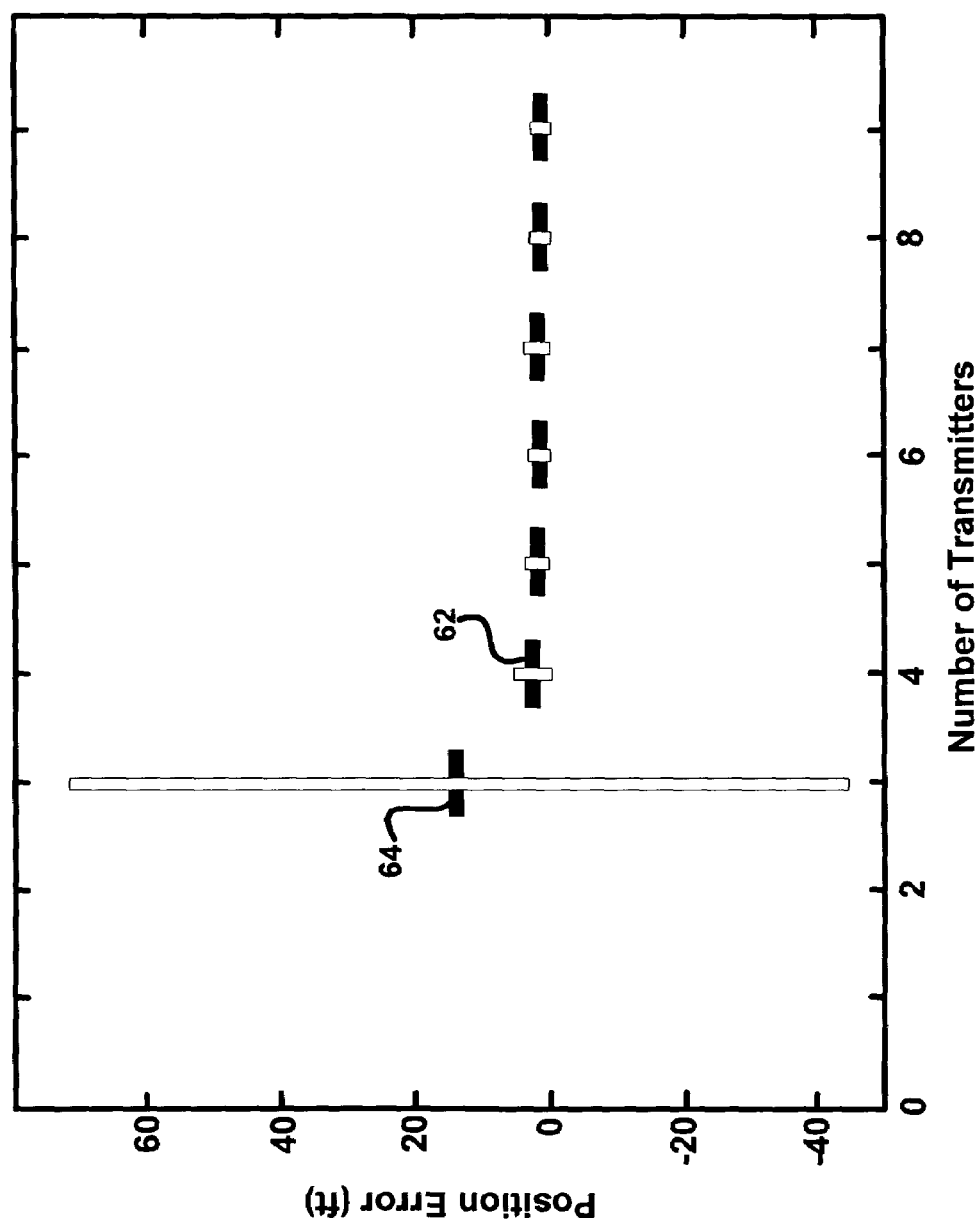
FIG. 3 shows an error bar plot of position error of the mean and mean plus standard deviation as a function of number of transmitters.

FIG. 3 shows an error bar plot of position error of the mean (shown as horizontal darkened rectangles) and mean plus standard deviation (shown as vertical non-darkened rectangles) as a function of number of transmitters (i.e., three to nine transmitters and one receiver) than can be utilized in an example-simulated network of the present invention using IEEE technology. FIG. 3 thus shows that by increasing the number of transmitters to four 62, mean position error decreases by up to about 20 feet from three transmitters 64 in this example, and measurement confidence increases (with a standard deviation decrease) by up to about 60 feet.

Figure 4:
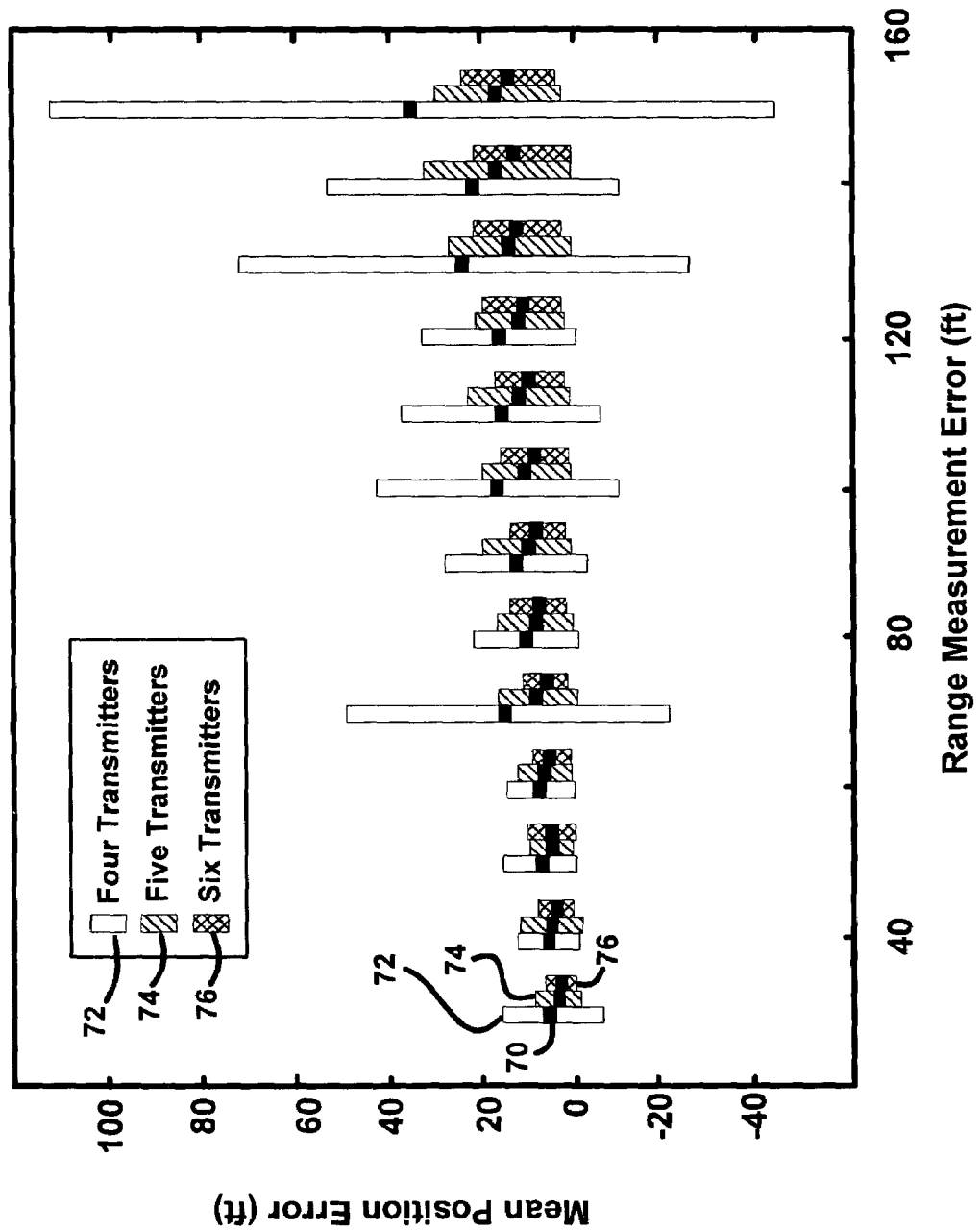
FIG. 4 shows mean position error data collected in the example simulation by varying mean range measurement error and a number of transmitters.

FIG. 4 shows mean position error data collected in the example simulation by varying mean range measurement error along with a predetermined number of transmitters to find an overall correlation between the three. The plot illustrates the impact on mean position error by varying both the mean 70 (shown as dark filled boxes) and the standard deviation having four transmitters 72 (shown as clear rectangles) and one receiver, five transmitters 74 (shown as diagonal line filled rectangles) and one receiver, and six transmitters 76 (shown as mesh filled rectangles) and one receiver. Such a plot shows that confidence in four transmitters, rather than three, when range measurement error is kept below about ±60 ft.

It should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A wireless position estimation method, comprising:
   statistically filtering time of flight information resulting from replies to queries to produce a plurality of range measurements, wherein said filtering further comprises:
   distributing a batch of time of flight data into predetermined histogram bins for extraction of a desired data;
   implementing an estimator to said desired data after every one or more new batch of extracted data; wherein said estimator minimizes a quadratic cost function of residual error and includes the previous estimate plus the scaled residual error; and
   calculating in a feedback operation, a position estimate from weighted values as a result of processing a predetermined collected number of filtered said range measurements.

2. The method of claim 1, wherein said statistical filtering further comprises removing data outliers from said filtered time-of flight information.

3. The method of claim 1, wherein said position estimation is capable of being determined down to about 1 ft.

4. The method of claim 1, wherein said method includes one or more transmitters and one or more receivers selected from cell phones, pagers, personal identification cards, laptops, and personal digital assistants (PDAs).

5. The method of claim 4, wherein said one or more receivers are adapted to operate using a commercial wireless communication standard.

6. The method of claim 5, wherein said wireless communication standard includes UWB frequencies.

7. The method of claim 5, wherein said wireless communication standard includes IEEE802.

8. The method of claim 5, wherein said wireless communication standard includes Bluetooth.

9. The method of claim 1, wherein said position estimation method can be adapted with a GPS system.

10. A wireless position estimation system, comprising:
    at least one receiver, capable of sending a wireless reply upon receipt of each of one or more wireless queries;

one or more transmitters capable of being arranged from known positions and capable of transmitting a plurality of said wireless queries; and an estimator that minimizes a quadratic cost function of residual error and includes a previous estimate plus a scaled residual error of extracted data so that a position estimate from weighted values can be calculated, wherein said wireless reply comprises one or more batches of data that are statistically filtered using said estimator.

11. The system of claim 10, wherein said one or more batches of data are further filtered to remove data outliers.

12. The system of claim 10, wherein a single transmitter is capable of being physically moved to said known positions.

13. The system of claim 10, wherein at least 3 transmitters are arranged at said known positions.

14. The system of claim 10, wherein said position estimation is capable of being determined down to about 1 ft.

15. The system of claim 10, wherein said at least one receiver and said one or more transmitters can include an apparatus selected from cell phones, pagers, personal identification cards, laptops, and personal digital assistants (PDAs).

16. The system of claim 10, wherein said one or more transmitters and said at least one receiver are configured to operate using a commercial wireless communication standard.

17. The system of claim 16, wherein said wireless communication standard includes UWB frequencies.

18. The system of claim 16, wherein said wireless communication standard includes IEEE802.

19. The system of claim 16, wherein said wireless communication standard includes Bluetooth.

20. The system of claim 10, wherein said wireless position estimation system includes a GPS system.

* * * * *